US008777716B2

(12) United States Patent
Miller

(10) Patent No.: US 8,777,716 B2
(45) Date of Patent: Jul. 15, 2014

(54) ROULETTE SIDE WAGERING SYSTEMS AND METHODS

(76) Inventor: David Lawrence Miller, Pompton Lakes, NJ (US)

( * ) Notice: Subject to any disclaimer, the term of this patent is extended or adjusted under 35 U.S.C. 154(b) by 114 days.

(21) Appl. No.: 13/270,418

(22) Filed: Oct. 11, 2011

(65) Prior Publication Data

US 2012/0088565 A1 Apr. 12, 2012

Related U.S. Application Data

(60) Provisional application No. 61/404,850, filed on Oct. 12, 2010.

(51) Int. Cl.
*A63F 9/24* (2006.01)
*G06F 17/00* (2006.01)

(52) U.S. Cl.
USPC ......... 463/17; 273/143 R; 273/142 R; 463/12

(58) Field of Classification Search
USPC .......................................... 463/17, 18, 19, 20
See application file for complete search history.

(56) References Cited

U.S. PATENT DOCUMENTS

| | | | | |
|---|---|---|---|---|
| 5,743,798 | A * | 4/1998 | Adams et al. | 463/17 |
| 6,059,659 | A * | 5/2000 | Busch et al. | 463/17 |
| 6,776,714 | B2 * | 8/2004 | Ungaro et al. | 463/27 |
| 7,204,488 | B2 | 4/2007 | Ilievski | |
| 7,533,885 | B2 | 5/2009 | Nicely et al. | |
| 2007/0057452 | A1 * | 3/2007 | Dargue | 273/143 R |
| 2007/0060237 | A1 * | 3/2007 | Rowe et al. | 463/12 |
| 2008/0116639 | A1 | 5/2008 | Ko et al. | |
| 2008/0252004 | A1 | 10/2008 | Au-Yeung | |
| 2009/0134574 | A1 * | 5/2009 | Sokolov | 273/142 R |
| 2009/0280888 | A1 * | 11/2009 | Durham et al. | 463/20 |
| 2010/0009744 | A1 | 1/2010 | Mugnolo et al. | |

* cited by examiner

*Primary Examiner* — Paul A D'Agostino
(74) *Attorney, Agent, or Firm* — Howard & Howard Attorneys PLLC

(57) ABSTRACT

Systems, methods and apparatus for providing and conducting a side or secondary wagering game with the underlying game of Roulette, which includes receiving a wager relating to the secondary wagering game, wherein the wager is resolvable after a preset amount of random Roulette outcomes have been obtained, generating the preset amount of random Roulette outcomes, storing each random Roulette game outcome of the preset amount, comparing the stored outcomes with preset criteria relating to the appearance of a pattern of indicia associated with Roulette outcomes, providing a payout corresponding to the wager if the preset criteria is satisfied and collecting the wager if the preset criteria is not satisfied.

20 Claims, 6 Drawing Sheets

ROULETTE SIDE WAGERING SYSTEMS AND METHODS

CROSS-REFERENCE TO RELATED APPLICATIONS

This application claims the benefit of U.S. Provisional Patent Application No. 61/404,850 which was filed Oct. 12, 2010, the disclosure of which is incorporated herein by reference.

BACKGROUND ART

1. Field of the Invention

The present invention relates to systems and methods of providing, conducting and modifying wagering games. In particular, the invention relates to systems and methods for providing and conducting a modified Roulette game and a side or secondary game using multiple Roulette outcomes.

2. Description of the Related Art

During the course of conventional Roulette play, the players place their chips or tokens on the betting layout located on the roulette table. The croupier or dealer (hereafter referred to as a dealer) spins the wheel to place the game in motion. At the same time the dealer spins the ball in the opposite direction. As the ball slows, it hits the frets located in the wheel head and then lands into a number that is associated with the table layout numbers. The dealer then settles the various wagers in accordance with payouts, odds and predetermined rules.

While Roulette is a popular game, many new games which are quickly rising in popularity provide numerous wagering opportunities, thereby increasing player participation and excitement. Consequently, modifications of existing wagering games such as Roulette are of interest to players and casino operators alike, at least as a means of maintaining and furthering the interest of regular players of the game in addition to attracting new players. Therefore, there is a continual desire for systems and methods for modifying Roulette in a manner which would increase player participation and wagering.

SUMMARY OF THE INVENTION

Some embodiments of the invention are directed to a method of conducting a side or secondary wagering game with the underlying game of Roulette, which includes the steps of: receiving a wager relating to the secondary wagering game, wherein the wager is resolvable after a preset amount of random Roulette outcomes have been obtained; generating the preset amount of random Roulette outcomes; storing each random Roulette game outcome of the preset amount; comparing the stored outcomes with preset criteria relating to the appearance of a pattern of indicia associated with Roulette outcomes; providing a payout corresponding to the wager if the preset criteria is satisfied; and collecting the wager if the preset criteria is not satisfied.

In some embodiments, the aforementioned method further includes the step of receiving a wager on the underlying game of Roulette. A Roulette wager may be mandatory or optional.

The preset amount of Roulette outcomes is preferably greater than two, but may be any amount, such as two, three, four, five, six or seven.

In some embodiments, the random Roulette outcomes are generated using a physical Roulette wheel, whereas in other embodiments, random Roulette outcomes are generated using a program with a random number generator configured for simulating random Roulette outcomes. Combinations of the physical and virtual Roulette wheels may also be used.

In some embodiments, each of the random Roulette game outcomes are stored in a memory device.

In some embodiments, the preset criteria may relate to the appearance of the same number in at least two or more of the stored outcomes, the appearance of the same color in all of the stored outcomes, the appearance of the same number in at least two or more of the stored outcomes and the appearance of the same color in all of the stored outcomes or the appearance of consecutive numbers.

Some embodiments of the invention are directed to a system for conducting a secondary wagering game with the underlying game of Roulette, which includes a player interface configured for receiving the indication of a wager relating to the secondary wagering game, wherein the wager is resolvable after a preset amount of random Roulette outcomes greater than two have been obtained; a device, method or apparatus for generating the preset amount of random Roulette outcomes; a memory device configured for storing each random Roulette game outcome of the preset amount; and a processing device configured for comparing the stored outcomes with preset criteria relating to the appearance of a pattern of indicia associated with Roulette outcomes and providing a payout amount corresponding to the wager if the preset criteria is satisfied.

In some embodiments, the aforementioned system further includes a dealer interface configured for facilitating receipt of the random roulette outcomes generated for storage in the memory device.

In some embodiments, the aforementioned system further includes a display configured for displaying the wager outcome, among other things, such as displaying the random Roulette outcomes.

In some embodiments, the aforementioned system generating the preset amount of random Roulette outcomes involves a physical Roulette wheel apparatus and/or a program using a random number generator and configured for providing simulated random Roulette outcomes.

Some embodiments of the invention are directed to a system for conducting a secondary wagering game with the underlying game of Roulette, which includes: a communication device for receiving a wager relating to the secondary wagering game, wherein the wager is resolvable after a preset amount of random Roulette outcomes greater than two have been obtained, and communicating the outcome of the wager; a processor for generating the preset amount of random Roulette outcomes, comparing the stored outcomes with preset criteria relating to the appearance of a pattern of indicia associated with Roulette outcomes, determining a payout amount corresponding to the wager if the preset criteria is satisfied; and a memory device for storing each random Roulette game outcome of the preset amount.

The communication device may be a data input and/or data output device or a remote computer terminal, such as a home computer or mobile device with access to local or global network. The system and communication device may be configured for providing the secondary wagering game to players via an online system or the Internet. The processor may also be remotely located from the communication device.

In some embodiments, the communication device, processor and display device are mounted within a unitary housing. The aforementioned system may be an electronic gaming machine or electronic platform including multiple data input devices providing player positions.

DETAILED DESCRIPTION

The exemplary embodiments herein relate to wagering games such as Roulette and modifications thereof in which additional or side wagers other than the standard underlying game wagers are placed by players and received by the house or casino to be subsequently resolved in a secondary wagering game which is resolved at least in part by the results of the standard underlying game of Roulette.

It should be understood that each of the methods and individual steps recited herein may be partially or wholly carried out in a variety of ways and/or systems, which may include, but are not limited to, a live dealer physically using Roulette components in a casino, an electronic gaming machine (EGM) for one or more players, standalone multiplayer platforms which may include a player interface such as a touchscreen display and a physical or virtual Roulette wheel, through a home computer or portable computing device, such as a tablet computer or mobile phone capable of communicating with a network or over the Internet, global telecommunication network or world wide web. It should further be understood that the methods and systems of the invention are described herein in connection with standard Roulette wheels for illustrative purposes only, as the methods and systems of the invention may be used with non-standard Roulette wheels, such as multiple Roulette wheels in which multiple outcomes are obtained or Roulette wheels with other indicia than colors and/or numbers, or any other wheels with varying distinguishable symbols.

Figure 1:
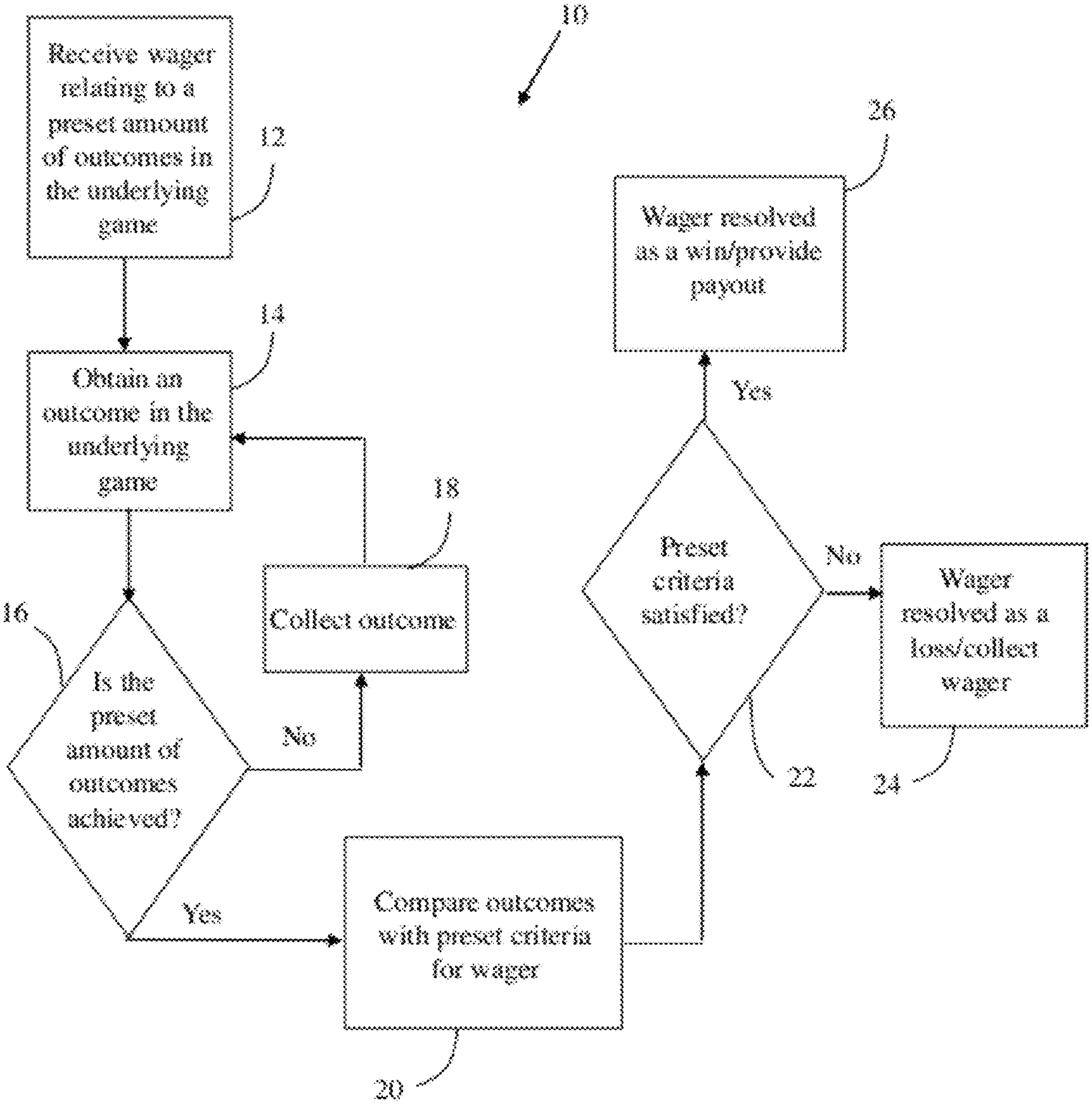
FIG. 1 is a process flow chart depicting an exemplary method configured according to some embodiments of the invention.

A method of playing a secondary game which is decided by a plurality of results from the underlying game of Roulette is generally referred to by the reference numeral 10 in FIG. 1.

In step 12, a wager is received by a player interested in playing the secondary game. In this embodiment, the secondary game is resolvable based on a comparison of the outcomes in the underlying game with preset criteria after a preset amount of outcomes in the underlying game have been determined. The preset criteria relates to aspects associated with the outcomes. For example, the aspects may relate to color, either red or black, and number. The preset criteria may therefore set forth a pattern of indicia, such as colors and/or numbers, as well as their sequence, which must be matched by the outcomes for the preset criteria to be satisfied.

In some embodiments, the player may place a wager that is resolvable based on a comparison of the outcomes after multiple preset amounts of outcomes. For example, first preset criteria must be satisfied by the outcomes after a first amount of outcomes and second preset criteria must be satisfied after a second or additional amount of outcomes, such as a number during a first three outcomes and all the same color over five outcomes. In some embodiments, separate wagers may be placed that are resolvable after different preset amounts of outcomes based on different preset criteria. For example, a wager may be placed that is resolvable after four outcomes and another wager may be placed that is resolvable based on six outcomes.

In some embodiments, a wager in the secondary game may be placed in step 12 at any time prior to the start of play of the underlying game of Roulette and without placing a wager in the underlying game. In other embodiments, a Roulette wager must also be placed at the time of placing a wager in step 12.

In step 14, an outcome is obtained in the underlying game of Roulette. As shown by step 16, if the preset amount of outcomes necessary for the resolution of the wager placed in step 12 is not achieved, then the outcome is collected or otherwise saved in step 18. Another outcome is obtained in step 14 and a determination is made in step 16 as to whether the preset amount of outcomes is now achieved based on the amount of outcomes increasing by one. If not, method 10 will continue repeating steps 18, 14 and 16 until the preset amount of outcomes is achieved.

It should be understood that for purposes of determining whether the preset amount of outcomes is obtained in step 16, the next outcome immediately after the wager is received in step 12 may be the first outcome obtained in step 14. It should also be understood that additional wagers may be placed after a first wager is received in step 12, but before the preset amount of wagers is obtained in step 16 in connection with the first wager. Each consecutive wager received in step 12 will be assessed in step 16 independently from any prior wagers and will begin with a different outcome obtained in step 14 than the prior wagers.

In some embodiments, step 18 may be facilitated through the use of physical or virtual markers placed on a physical or virtual standard Roulette layout. In other embodiments, a computerized display which may track game outcomes automatically or in response a dealer interface. In yet other embodiments, a display for showing game outcomes may be maintained by a live dealer. In some embodiments, a double or multi-Roulette wheel may be used to provide two or more outcomes at once in step 14.

As shown by step 16, once the preset amount of outcomes is achieved, then the outcomes, including collected outcomes in step 18, will be compared with the preset criteria for the wager in step 20.

As shown by step 22, if the preset criteria are not satisfied, then the wager is resolved as a loss and the money involved in the wager received in step 12 is made irretrievable, permanently lost or otherwise collected in step 24. If the preset criteria are satisfied in step 22, then the wager is resolved as a win and an award or payout is provided in step 26. The payout may be a set amount, progressive or odds payout. The payout may be based on a multiple of the amount of money involved in the wager.

In some embodiments, the preset criteria is based on a plurality of outcomes exhibiting certain aspects over a preset amount of outcomes, wherein the plurality of outcomes is less than the preset amount of outcomes. For example, the preset criteria may be configured so that it will be satisfied if a specific four outcome pattern of indicia, such as four consecutive numbers or four outcomes of the same color, is exhibited among seven Roulette outcomes. It should be understood that the preset criteria may be configured to require that the four outcome pattern be achieved either in sequence by outcome or irrespective of the order in which they appear among the seven outcomes.

In other embodiments, the plurality of outcomes is the same as the preset amount of outcomes. For example, the preset criteria may be configured so that it will be satisfied if a specific five outcome pattern of indicia, such as five outcomes of all even numbers or all odd numbers, is exhibited in five Roulette outcomes.

Other examples of patterns of indicia which may be employed or included in connection with the preset criteria in any of the embodiments described herein include, all numbers in any one of the first, second or third dozens, all numbers in the first, second or third columns, a number from each of the first, second and third dozens, a number from each of the first, second and third columns, all numbers in any one or more rows, any pattern of colors or numbers, any one number or color, and any of the above further including one or more zero or double zero outcomes. These examples primarily presume standard "American" or "European" style Roulette wheels. However, it should be readily apparent that the embodiments described herein may be applied to wheels including customized indicia or other games, and the preset criteria may include alternate satisfaction requirements accordingly, all of which within the spirit and scope of the invention.

indicia are exhibited among the preset amount of outcomes, then the preset criteria are satisfied and a payout is awarded as shown by steps 22 and 26. However, in step 26, the particular payout may be based on the specific pattern of indicia exhibited which satisfies the preset criteria. For example, the preset criteria may set forth that the appearance of the same number twice over four outcomes pays double the wager, the appearance of the same color over four outcomes pays triple the wager, and further set forth that the appearance of the same number three times over four outcomes pays ten times the wager.

In some embodiments, the patterns of indicia may be expressed in poker terms. For example, one pair may be the same number appearing in two outcomes of the preset amount of outcomes and a flush may be the same color appearing in all of the preset amount of outcomes.

The following table provides exemplary payouts based on the unit or monetary amount wagered for achieving various respective preset criteria after a preset amount of outcomes. In this embodiment, the exemplary patterns of indicia shown in the table are configured based on the use of a standard American style Roulette wheel for a preset amount of five outcomes. For illustrative purposes, these patterns of indicia are expressed in poker-like terms, which among other things, may facilitate a quicker understanding by players of this embodiment of the invention. It should be understood that the patterns of indicia may be expressed in other ways, and other payout formulas may be used with these patterns, which may be based on odds, set awards, and all or portions of an incrementing metered progressive award.

| Pattern | Payout to wager |
|---|---|
| Pair (two outcomes with the same number in five outcomes) | 2 |
| Two Pair (two outcomes with the same first number and two outcomes with the same second number different from the first number in five outcomes) | 7 |
| Three of a Kind (three outcomes with the same number in five outcomes) | 10 |
| Full House (three outcomes with the same first number and two outcomes with the same second number different from the first number in five outcomes) | 125 |
| Four of a Kind (four outcomes with the same number in five outcomes) | 250 |
| Straight (five outcomes with consecutive numbers in five outcomes) | 500 |
| Flush (five outcomes with the same color in five outcomes) | 3 |
| One Pair with Flush (two outcomes with the same number and all five outcomes with the same color in five outcomes) | 5 |
| Two Pair with Flush (two outcomes with the same first number, two outcomes with the same second number different from the first number and all five outcomes the same color in five outcomes) | 15 |
| Three of a Kind with Flush (three outcomes with the same number and all five outcomes with the same color in five outcomes) | 20 |
| Full House with Flush (three outcomes with the same first number and two outcomes with the same second number different from the first number and all five outcomes the same color in five outcomes) | 150 |
| Four of a Kind with Flush (four outcomes with the same number and all five outcomes with the same color in five outcomes) | 300 |
| Straight Flush (odd or even) (five consecutive odd or even outcomes with all five outcomes the same color in five outcomes) | 1000 |
| Five of a Kind (five outcomes with the same number in five outcomes) | 20000 |

In some embodiments, the preset criteria relates to a pattern of indicia. If the pattern of indicia is exhibited after the preset amount of outcomes have been obtained, then the preset criteria are satisfied and a payout is awarded, as shown by steps 22 and 26. For example, the preset criteria may be the appearance of a pattern defined by the same number more than once in the preset amount of outcomes, and satisfaction thereof in step 22 is associated with a payout in step 26 of double the wager.

In other embodiments, the preset criteria relates to a plurality of patterns of indicia. Thus, if any of the patterns of For example, if a 10 dollar wager is received in connection with the side wagering game as described in this embodiment, and the next five roulette outcomes are 2, 4, 6, 8, 10, in any order, then the payout would be $10,000 based on the preset criteria being satisfied for a pattern of indicia identified above as a "Straight Flush (even)" because the numbers are all even and the same color according to the standard American roulette wheel used in this embodiment. In another example, if a 100 dollar wager is received in connection with the side wagering game as described in this embodiment, and the next five roulette outcomes are 7, 14, 16, 25, and 7, then the payout would be $1500 based on the preset criteria being satisfied for a pattern of indicia identified above as a "Two Pair with Flush."

Figure 2:
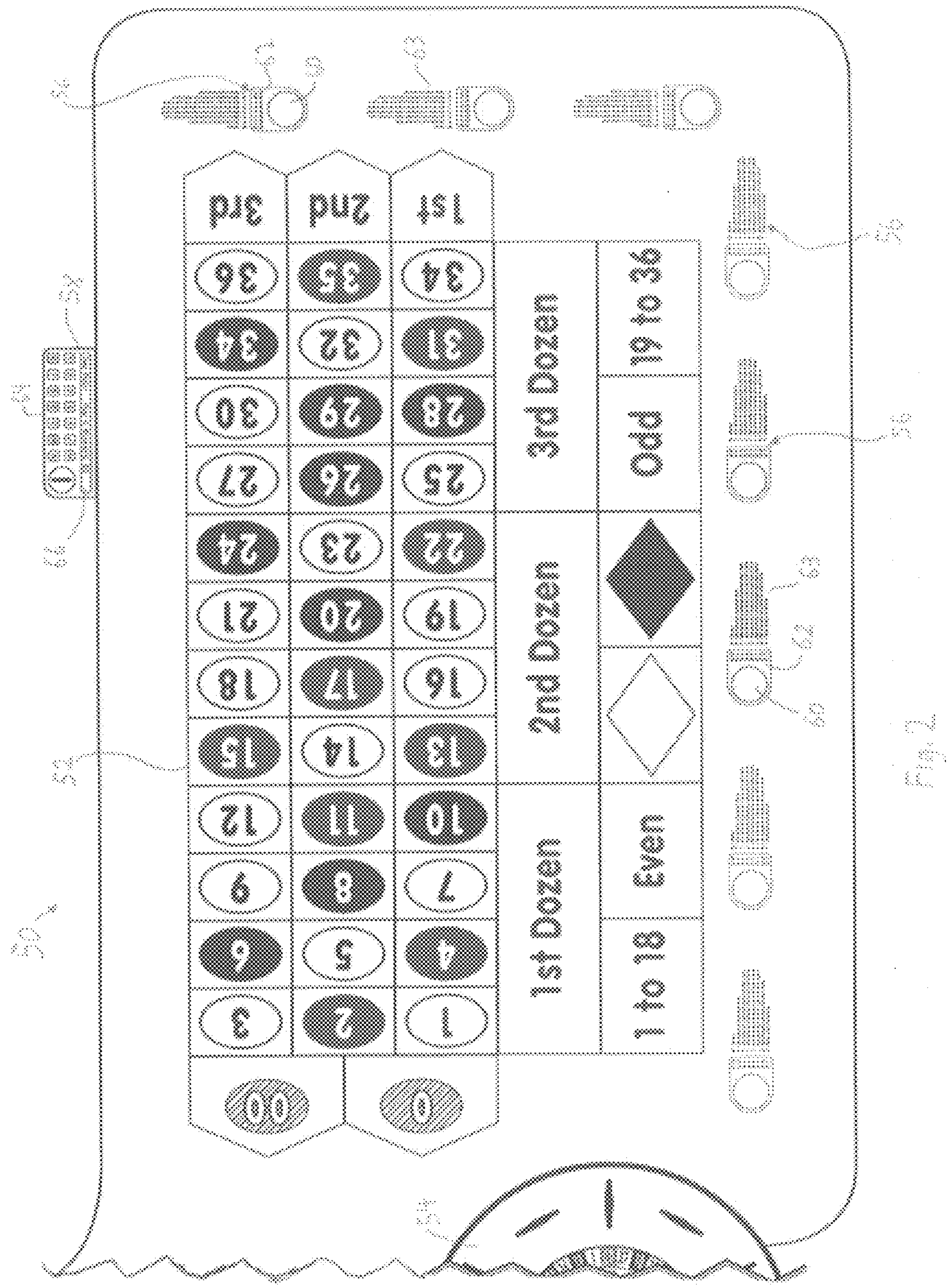
FIG. 2 is an exemplary Roulette layout configured for use with methods according to some embodiments of the invention.
Figure 3:
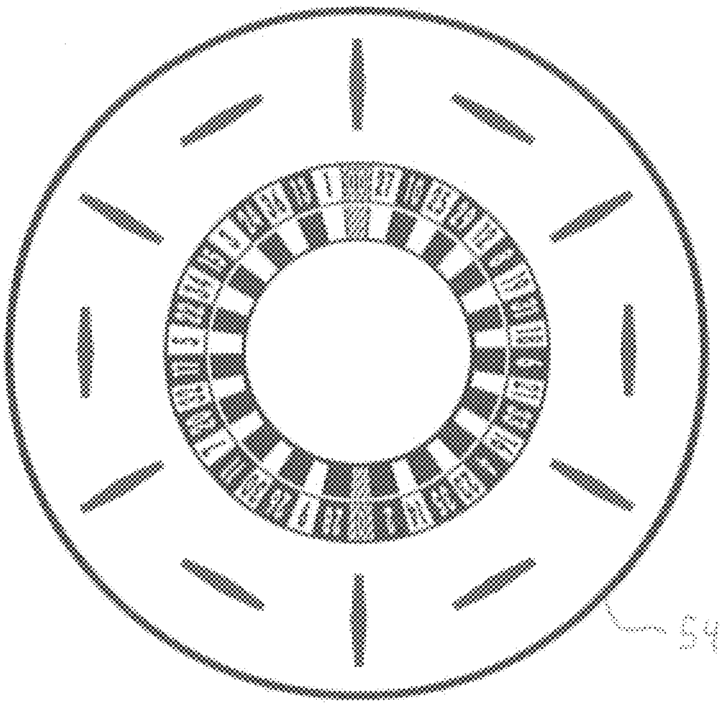
FIG. 3 is a schematic of a conventional American style Roulette wheel with double zero which may be used with the exemplary layout shown in FIG. 2.

FIG. 2 illustrates an exemplary system 50 configured for operating in accordance with embodiments of the invention, such as method 10. System 50 includes a standard Roulette layout 52 for use with the American style or Double Zero Roulette wheel 54 shown in FIG. 3. In this embodiment, layout 52 and Roulette wheel 54 are physically represented, however, it should be understood that the methods of the invention would function as described herein if either one or both were virtual. System 50 further includes multiple player interfaces 56 accessible on layout 52 and a dealer interface 58.

Figure 4:
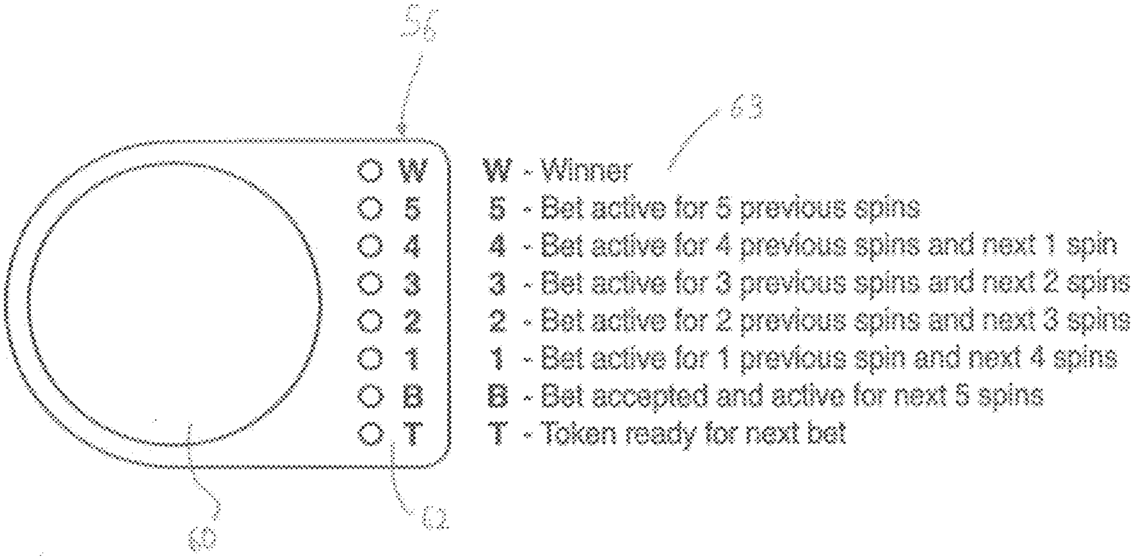
FIG. 4 is a schematic diagram of an exemplary player interface configured and constructed according to some embodiments of the invention and which may be used with the exemplary layout shown in FIG. 2.

As shown in FIG. 4, in this embodiment each player interface 56 includes a bet sensor 60 with a light pad 62 including the following lights: the "T" light indicating when lit that a bet may be placed on sensor 60; the "B" light indicating when lit that the bet placed on bet sensor 60 has been accepted; the "1" light indicating when lit that the first Roulette outcome has been obtained since the bet was accepted; the "2" light indicating when lit that the second Roulette outcome has been obtained since the bet was accepted; the "3" light indicating when lit that the third Roulette outcome has been obtained since the bet was accepted; the "4" light indicating when lit that the fourth Roulette outcome has been obtained since the bet was accepted; the "5" light indicating when lit that the fifth Roulette outcome has been obtained since the bet was accepted; and the "W" light indicating when lit that the wager has been won and a payout will be made or has been credited. If the wager is not won then the "W" light is not lit and the accepted bet is collected. After the bet is collected or payout is made then the "W" light will turn off, if applicable, and the "T" light will be lit to indicate that the player interface is ready for another wager. In this embodiment, corresponding text 63 provides an explanation of the lights included in player interface 56.

Figure 5:
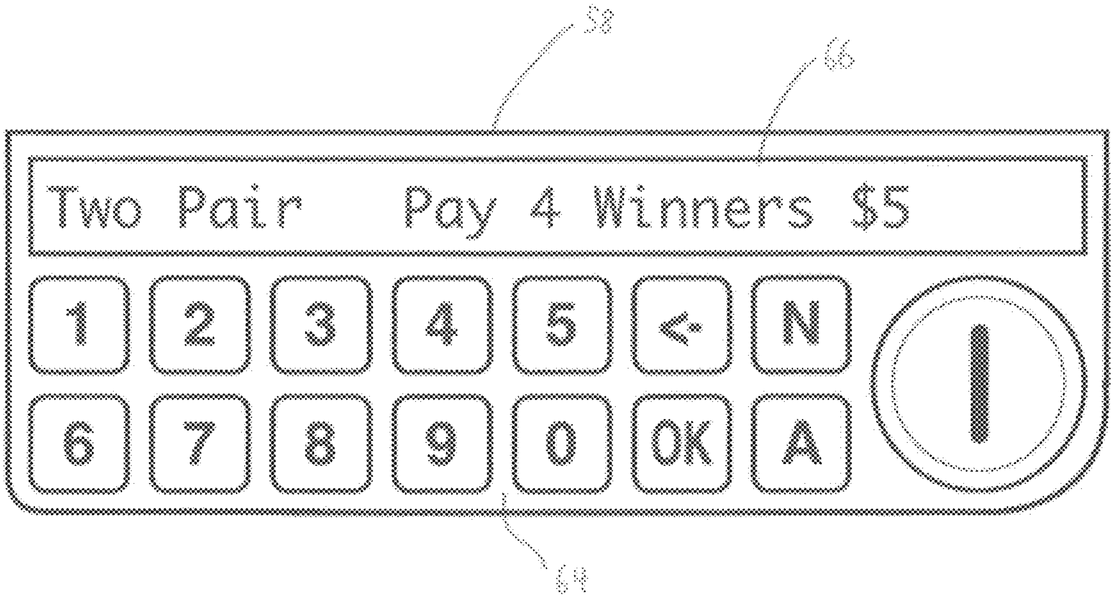
FIG. 5 is a schematic diagram of an exemplary dealer interface configured and constructed according to some embodiments of the invention and which may be used with the exemplary layout shown in FIG. 2.

As shown in FIG. 5, in this embodiment, dealer interface 58 includes a keypad 64 and display screen 66. Keypad 64 allows the dealer to make one or more player interfaces 56 ready to accept new wagers (causing the "T" light thereon to be lit), locking one or more player interfaces 56 when accepting a wager (causing the "B" light to be lit), and entering each Roulette outcome. Display 66 facilitates proper administration of the wagers placed by providing information regarding payout, such as how many players have won, the associated player interfaces 56 through which winning wagers were placed, and the amounts won, if any.

System 50 may include a processing device in communication with a database or memory device with programs for facilitating its operation, including the determination of winning wagers on display screen 66. The memory device may include data relating to the underlying game and embodiments of the invention as described herein, such as the preset criteria. In some embodiments, system 50 further includes a display in communication with dealer interface 58 that is openly viewable for displaying the results of each outcome and/or winning wagers, among other things.

Figure 6:
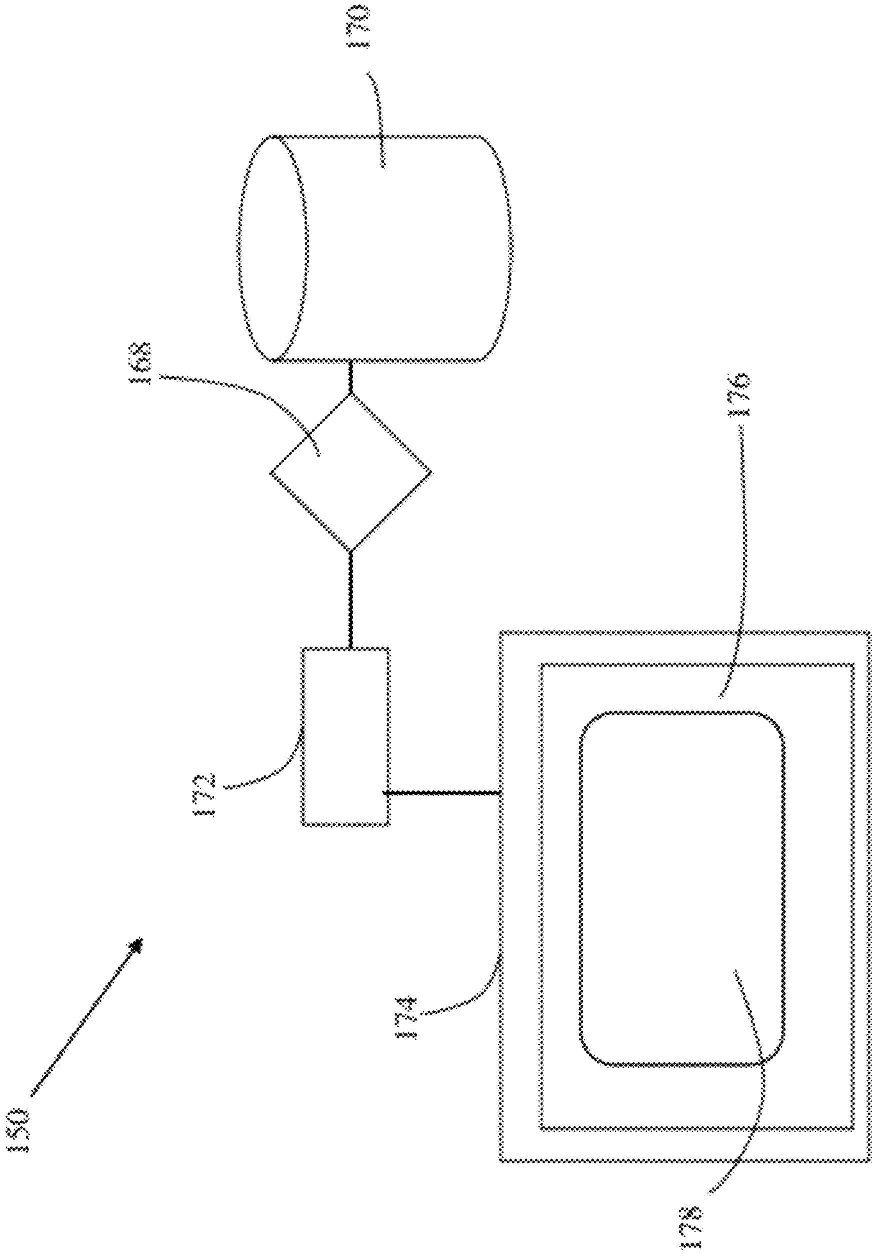
FIG. 6 is a schematic diagram of exemplary system components configured for use with methods according to some embodiments of the invention.

FIG. 6 illustrates an exemplary system 150 constructed in accordance with some embodiments of the invention. System 150 includes processing device 168 in communication with a database or memory device 170, communication or data input/output device 172 and a display device 174. In some embodiments, display device 174 is a touch-enabled device and includes a data input device component. Memory device 170 may include data relating to the underlying game and embodiments of the invention as described herein, such as the preset criteria. A player position 176 is displayed on display device 174 along with virtual representation of a Roulette layout and wagering area 178 for transmitting wagers in accordance with any of the embodiments herein, such as method 10. Game outcomes are displayed and side wagers are tracked using display device 174 and processing device 168 compares each outcome with the preset amount of outcomes and stores each outcome in memory device 170 until the preset amount of outcomes are obtained. Once the preset amount of outcomes are obtained, the processing device 168 compares the outcomes with the preset criteria stored in memory 170 to determine whether the preset criteria is satisfied by the pattern of indicia exhibited in the game outcomes. Should the preset criteria be satisfied, a payout will be determined by processing device 168 indicated on display device 174. If the preset criteria are not satisfied, the same is indicated on display device 174.

Those skilled in the art will readily appreciate that the methods described herein may be incorporated in a system in accordance with the invention using virtual representations of Roulette wheels and Roulette table layouts. The system of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with useful access thereto or the opportunity to play the game as described herein.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

What is claimed is:

1. A method of conducting a secondary wagering game with the underlying game of Roulette for use with American and European Roulette wheels having conventional single-zero or double-zero pockets and pocket indicia displayed thereon and an associated display device for displaying a virtual representation of a Roulette layout, comprising the steps of:

a) receiving a secondary game wager from a player relating to the secondary wagering game independently of any wagers received in the underlying Roulette game, wherein the secondary game wager is only resolvable after a preset amount of random Roulette outcomes greater than two have been obtained in the two or more instances of play of the underlying Roulette game subsequent to the receipt of the secondary game wager from the player;

b) generating the preset amount of random Roulette outcomes in the underlying Roulette game, each of the Roulette outcomes generated being used to determine the outcome of wagers placed in the underlying Roulette game independently of the secondary wagering game, wherein each of the random Roulette outcomes identifies a specific number and a specific color from the indicia displayed on the pockets of one of either an American or a European Roulette wheel;

c) indicating each random Roulette game outcome of the preset amount by displaying a virtual marker on the Roulette layout shown on the display device until the preset amount of random Roulette outcomes have been generated, wherein the indicated Roulette game outcomes are associated only with the player from which the secondary game wager is received;

d) comparing the indicated Roulette game outcomes of the preset amount with preset criteria responsive to the preset amount of random Roulette outcomes being generated, wherein the preset criteria defines a relationship between the identified numbers, the identified colors, or both of the identified numbers and the identified colors of the Roulette outcomes and one or more poker rankings, the relationship being independent of the outcome of any wagers received in the underlying Roulette games generated;

e) providing a payout to the player from which the secondary game wager is received corresponding to the secondary game wager if the preset criteria is satisfied; and f) collecting the secondary game wager if the preset criteria is not satisfied.

2. A method according to claim 1, further comprising the step of receiving a wager on the underlying game of Roulette.

3. A method according to claim 1, wherein the preset amount is three.

4. A method according to claim 1, wherein the preset amount is four.

5. A method according to claim 1, wherein the preset amount is five.

6. A method according to claim 1, wherein the preset amount of random Roulette outcomes are generated using a physical Roulette wheel.

7. A method according to claim 1, wherein the preset amount of random Roulette outcomes are generated using a program with a random number generator configured for simulating random Roulette outcomes.

8. A method according to claim 1, wherein each of the random Roulette game outcomes are stored in a memory device.

9. A method according to claim 1, wherein the preset criteria relates to the appearance of the same number in at least two or more of the stored outcomes.

10. A method according to claim 1, wherein the preset criteria relates to the appearance of the same color in all of the stored outcomes.

11. A method according to claim 1, wherein the preset criteria relates to the appearance of the same number in at least two or more of the stored outcomes and the appearance of the same color in all of the stored outcomes.

12. A system for conducting a secondary wagering game with the underlying game of Roulette including one of an American Roulette wheel and a European Roulette wheel having conventional single-zero or double-zero pockets and pocket indicia displayed thereon, comprising:

a) a player interface configured for displaying a Roulette layout and receiving the indication of a secondary game wager relating to the secondary wagering game independently of any wagers received in the underlying Roulette game, wherein the wager is resolvable only after a preset amount of random Roulette outcomes greater than two have been obtained in the two or more instances of play of the underlying Roulette game subsequent to the receipt of the indication of a secondary game wager;

b) means for generating the preset amount of random Roulette outcomes in the underlying Roulette game corresponding to an outcome from one of either the American or European Roulette wheel having conventional single-zero or double-zero pockets and pocket indicia displayed thereon, each of the Roulette outcomes generated being used to determine the outcome of wagers placed in the underlying Roulette game independently of the secondary wagering game, wherein each of the random Roulette outcomes identifies a specific number and a specific color from the indicia displayed on the pockets of one of either an American or a European Roulette wheel;

c) a memory device configured for storing each random Roulette game outcome of the preset amount until the preset amount of random Roulette outcomes have been generated subsequent to the receipt of the indication of a secondary game wager, wherein the stored Roulette game outcomes are associated with the player interface from which the indication of a secondary game wager is received; and d) a processing device configured for comparing the stored outcomes with preset criteria responsive to the preset amount of random Roulette outcomes being generated subsequent to receipt of the indication of a secondary game wager, wherein the preset criteria relates to the appearance of a pattern of indicia associated with Roulette outcomes and defines a relationship between the identified numbers, the identified colors, or both of the identified numbers and the identified colors of the Roulette outcomes and one or more poker rankings independent of Roulette, the relationship being independent of the outcome of any wagers received in the underlying Roulette games generated, and providing a payout amount corresponding to the secondary game wager if the preset criteria is satisfied, wherein each Roulette outcome of the preset amount of random Roulette outcomes is indicated by a display of a virtual marker on the Roulette layout displayed on the player interface until the preset amount of random Roulette outcomes have been generated.

13. A system as recited in claim 12, further comprising a dealer interface configured for facilitating receipt of the random roulette outcomes generated for storage in the memory device.

14. A system as recited in claim 12, further comprising a display configured for displaying the secondary game wager outcome.

15. A system as recited in claim 12, further comprising a display configured for displaying the random Roulette outcomes.

16. A system as recited in claim 12, wherein the means for generating the preset amount of random Roulette outcomes is a physical Roulette wheel.

17. A system as recited in claim 12, wherein the means for generating the preset amount of random Roulette outcomes is a program using a random number generator and configured for providing simulated random Roulette outcomes.

18. A system for conducting a secondary wagering game with the underlying game of Roulette, comprising:

a) a communication device including a display for displaying a Roulette layout thereon and a data input device for receiving a secondary game wager relating to the secondary wagering game, wherein the secondary game wager is resolvable after a preset amount of random Roulette outcomes greater than two have been obtained in the two or more instances of play of the underlying Roulette game subsequent to the receipt of the secondary game wager, and communicating the outcome of the secondary game wager;

b) a processor for generating the preset amount of random Roulette outcomes in the underlying Roulette game corresponding to an outcome from one of either an American or European Roulette wheel having conventional single-zero or double-zero pockets and pocket indicia displayed thereon, comparing the stored outcomes with preset criteria responsive to the preset amount of random Roulette outcomes being generated subsequent to receipt of the secondary game wager, wherein the preset criteria defines a relationship between the Roulette outcomes and one or more poker rankings independent of Roulette, the relationship being independent of the outcome of any wagers received in the underlying Roulette games generated, and determining a payout amount corresponding to the secondary game wager if the preset criteria is satisfied; and c) a memory device for storing each random Roulette game outcome of the preset amount until the preset amount of random Roulette outcomes have been generated subsequent to the receipt of the secondary game wager, wherein the stored Roulette game outcomes are associated with the player from which the secondary game wager is received, wherein each Roulette game outcome of the preset amount of random Roulette game outcomes is indicated by a display of a virtual marker on the Roulette layout displayed on the communication device until the preset amount of random Roulette outcomes have been generated.

19. A system as recited in claim 18, wherein the communication device, processor and memory are mounted in a unitary housing.

20. A system according to claim 19, wherein the processor is remotely located from the communication device.

* * * * *